Figure 1:
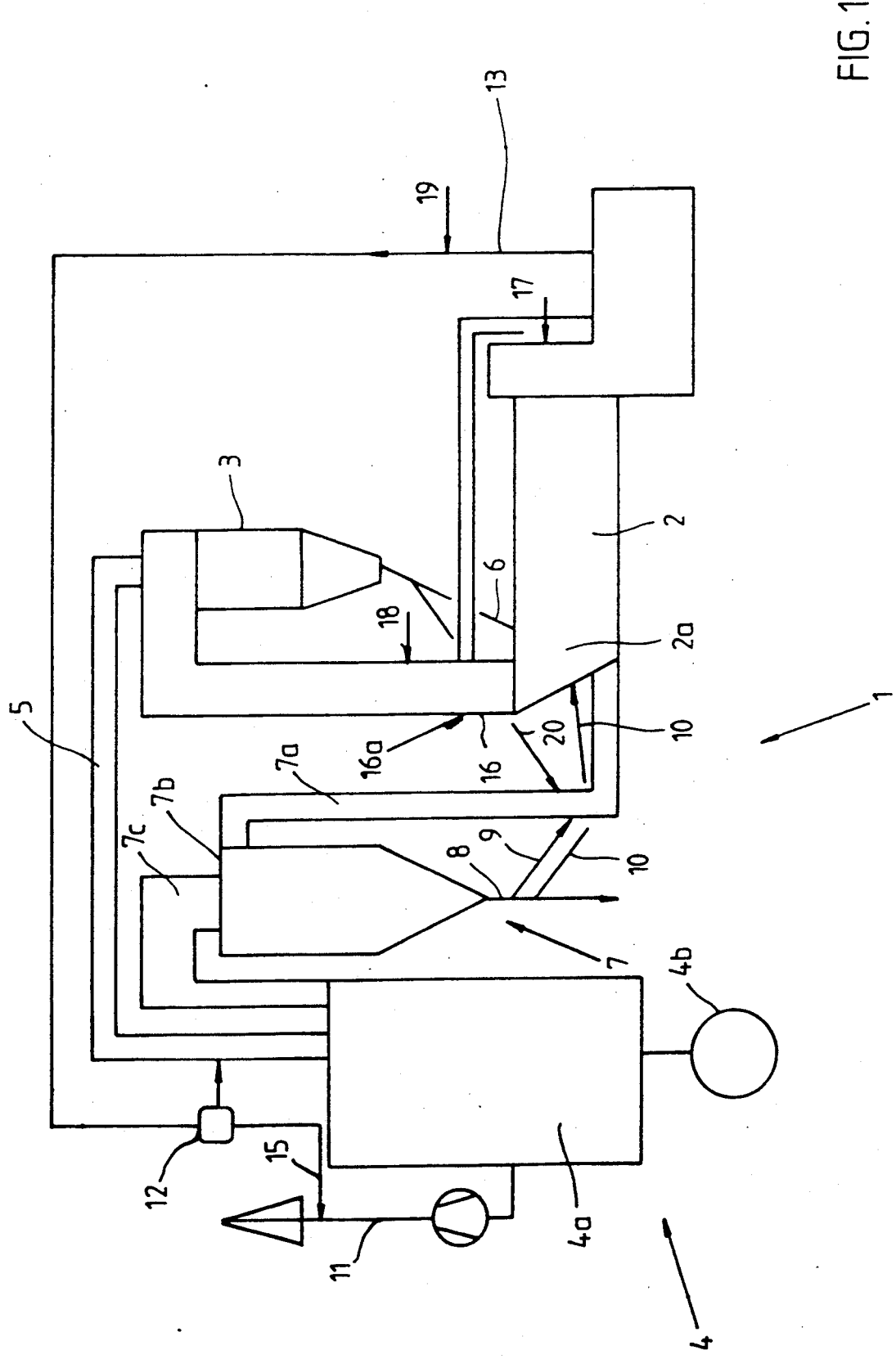

USOO5216884A

United States Patent [19]
Holsiepe

[11] Patent Number: 5,216,884
[45] Date of Patent: Jun. 8, 1993

[54] METHOD AND APPARATUS FOR PRODUCING BURNT MATERIAL AND FOR GENERATING ELECTRICAL ENERGY

[75] Inventor: Dietmar Holsiepe, Ennigerloh, Fed. Rep. of Germany

[73] Assignee: Krupp Polysius AG, Fed. Rep. of Germany

[21] Appl. No.: 796,856

[22] Filed: Nov. 25, 1991

[30] Foreign Application Priority Data

Dec. 21, 1990 [DE] Fed. Rep. of Germany ....... 4041251

[51] Int. Cl.$^5$ .............................................. F01K 17/00
[52] U.S. Cl. .......................................... 60/648; 60/670
[58] Field of Search .................................. 60/648, 670

[56] References Cited

U.S. PATENT DOCUMENTS

| | | | |
|---|---|---|---|
| 4,126,000 | 11/1978 | Funk | 60/648 |
| 4,507,153 | 3/1985 | Herchenbach | 432/13 |
| 4,541,245 | 9/1985 | Becker | 60/648 |

Primary Examiner—Stephen F. Husar
Attorney, Agent, or Firm—Learman & McCulloch

[57] ABSTRACT

The invention relates to a method and apparatus for producing burnt material and for generating electrical energy, in which the material is burnt using lower-grade fuel in a rotary kiln by means of hot kiln exhaust gases and at least a proportion of the quantity of heat contained in the exhaust gases from the rotary kiln is converted into electrical energy, the temperature of these kiln exhaust gases being between 700° and 1200° C., preferably between 800° and 900° C.

19 Claims, 2 Drawing Sheets

METHOD AND APPARATUS FOR PRODUCING BURNT MATERIAL AND FOR GENERATING ELECTRICAL ENERGY

The invention relates to a method and to apparatus for producing burnt material and for generating electrical energy.

In the cement industry attempts are being made to make sensible use of the hot kiln exhaust gases resulting from the burning of material in a rotary kiln. The hot exhaust gases are used in particular for drying and preheating the material which is to be burnt.

Tests have already been carried out in practice using the quantity of heat remaining in the kiln exhaust gases after such a drying or preheating process for generating electrical energy. However, this quantity of heat is normally so small that generation of electrical energy is two costly and therefore uneconomic.

The object of the invention, therefore, is to provide a method and apparatus in which the production of burnt material and the generation of electrical energy are possible in an economical manner.

This object is achieved by the combustion of a sufficient quantity of low-grade fuel in which to produce cement clinker and to generate hot exhaust gases having a temperature between 700° and 1200° C., preferably between 800° and 900° C., and which is sufficiently high to enable the generation of electrical energy.

The method according to the invention is particularly advantageous when large quantities of favourably priced fuel of lower quality are available (if possible fuel which can be extracted near the plant). Under these preconditions, using the method according to the invention it is possible to generate from the kiln exhaust gases up to double the quantity of electrical energy required for the operation of the entire apparatus. In this way it is possible at least to compensate for the reduction in the degree of economy of the production of the burnt material resulting from the increase in the temperature of the kiln exhaust gases after the preheater (so long as the material to be burnt is preheated by the kiln exhaust gases).

Illustrative embodiments of the invention are explained in greater detail with the aid of the description and the drawings.

Figure 3:
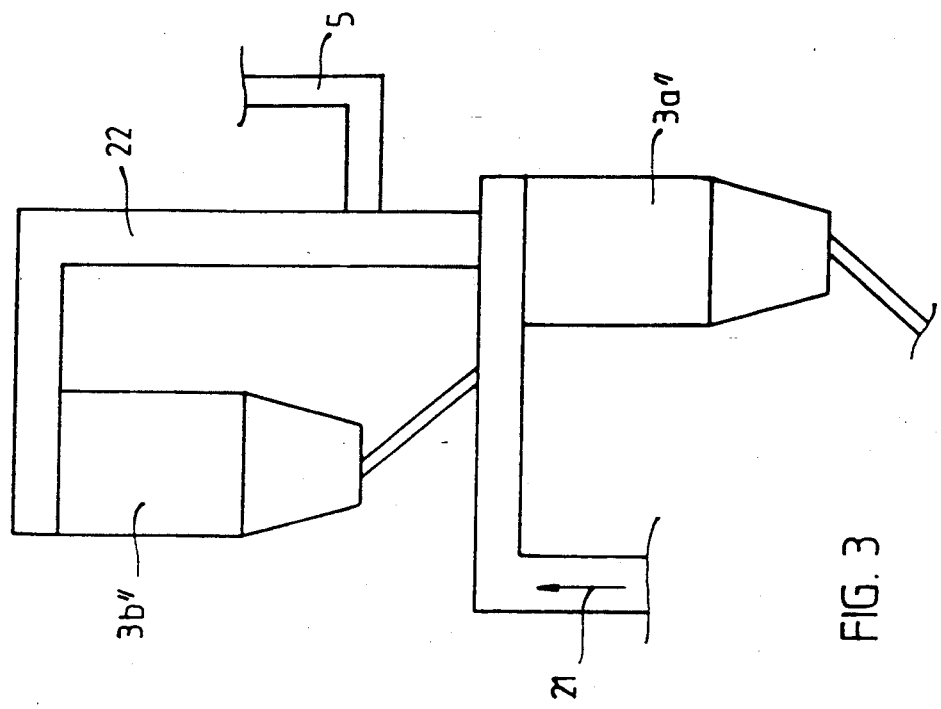
Figure 2:
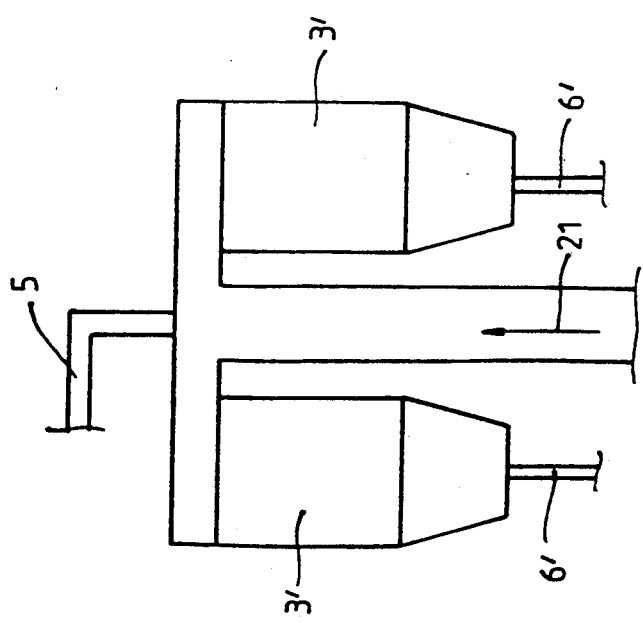

In the drawings:

FIG. 1 shows a schematic representation of apparatus according to the invention, FIG. 2 shows a schematic representation of a second embodiment of the preheater, FIG. 3 shows a schematic representation of a third embodiment of the preheater.

The apparatus 1 according to the invention which is illustrated in FIG. 1 consists essentially of a rotary kiln 2, a preheater 3 which is connected upstream of the rotary kiln and through which the hot kiln exhaust gases flow, and apparatus 4 for generating electrical energy which is connected to the preheater 3 by a gas conduit 5.

A duct 6 leads from the preheater 3, which is constructed as a single-stage cyclone preheater, to the inlet region of the rotary kiln 2.

Within the scope of the invention it is, of course, also possible to use two or more parallel connected cyclone preheaters 3' (cf. FIG. 2) instead of one single cyclone preheater 3. In this case the hot kiln exhaust gases represented by the arrow 21 would be divided between both cyclone preheaters 3'. Ducts 6' lead from both cyclone preheaters 3' to the inlet region 2a of the rotary kiln.

The third embodiment of the preheater 3 shown in FIG. 3 is a two-stage cyclone preheater. The hot kiln exhaust gases (arrow 21) pass first of all into the lower cyclone 3a'' and from there into the upper cyclone 3b''.

In order to be able to use kiln exhaust gases with a temperature between 700° and 1200° C., preferably between 800° and 900° C., for the generation of electrical energy, at least a proportion of the hot kiln exhaust gases is branched off after the lower cyclone 3a''. For this purpose the conduit 5 from the apparatus 4 for generating electrical energy opens into a duct 22 which connects the lower cyclone 3a'' to the upper cyclone 3b''.

Naturally, within the scope of the invention preheaters are also conceivable which have an even greater number of stages, so long as it is ensured that the given temperature range for the kiln exhaust gases for generation of electrical energy is adhered to.

The apparatus 4 for generating electrical energy is essentially formed by one or more boilers 4a and a generator 4b. Furthermore, for connection of the rotary kiln 2 to the apparatus 4 for generating electrical energy a bypass 7 is provided which is formed by a duct 7a which leads off from the inlet region 2a of the rotary kiln 2 and opens into the upper region of a cyclone 7b and by a duct 7c which leads from the upper region of the cyclone 7b to the boiler 4a.

A duct 8 leads off from the lower region of the cyclone 7b, and from this duct 8 are branched on the one hand a duct 9 which opens into the duct 7a of the bypass and on the other hand a duct 10 which leads to the inlet region 2a of the rotary kiln 2.

An induced draught duct 11 leads off from the boiler 4a to a filter (which is not shown), for example an electrostatic filter.

A cooler which cools the burnt material with air is connected downstream of the rotary kiln 2. The air thus heated is led off via a duct 13 and can be fed for example by a delivery duct 14 into the connection 5 and thus into the apparatus 4 for generating electrical energy. An additional possibility consists of allowing the duct 13 to open into the induced draught duct 11 at a delivery duct 15. For this purpose a branching or change-over device 12 is provided in the duct 13.

Furthermore, a calciner 16 which has a delivery duct 16a by means of which the raw meal or a mixture of raw meal and fuel can be delivered is arranged above the inlet region 2a of the rotary kiln 2. Further fuel can be introduced in the region of the calciner 16 via a fuel delivery duct 18 and into the duct 13 via a fuel delivery duct 19.

The way in which the apparatus functions is explained in greater detail below:

The exhaust gases from the rotary kiln 2 are led into the preheater 3 via the calciner 16 where they come into contact with material to be burnt and thereby heat this material. The preheated material then passes via the duct 6 to the inlet region 2a of the rotary kiln 2.

After the preheating of the material to be burnt, the kiln exhaust gases have a temperature between 700° and 1200° C., preferably between 800° and 900° C. They pass via the connection 5 into the boiler 4a in which steam is generated which is then utilised by a turbine (which is not shown) and the generator 4b to generate electrical energy.

By means of the bypass duct 7a the hot kiln exhaust gases can also be delivered directly to the boiler 4a, i.e., without loss of heat through preheating the material to be burnt, for generating electrical energy.

A duct 20 branches off from the duct 6 leading from the preheater 3, and a proportion or the total quantity of the preheated material can be drawn off via this duct 20 and introduced into the duct 7a of the bypass 7. Thus the bypass 7 also offers the possibility of subjecting the material which has been preheated in the preheated 3 to approximately 800° to 900° C. to further direct heat treatment with the substantially hotter kiln exhaust gases (1100° to 1200° C.). The material is led via the duct 7a into the cyclone 7b and from there it passes via the ducts 8 and 10 to the inlet region 2a of the rotary kiln 2.

Finally, the bypass 7 can be used if required to eliminate undesirable pollutants in the rotary kiln 2. The fine-grained material which is also to some extent precipitated with the pollutants is circulated in the duct 7a, the cyclone 7b and the ducts 8 and 9 until it is sufficiently enriched and can then be removed from the apparatus via the duct 8.

After the calcination the preheated material is subjected to final burning in the rotary kiln 2 and then cooled with air in the cooler.

The air which is heated during this cooling passes via the duct 13 either via the delivery duct 14 to the connection 5 and thus into the apparatus 4 for generating electrical energy or is introduced via the delivery duct 15 into the induced draught duct 11. The fuel delivery duct 19 in the duct 13 facilitates any further heating of this air which may be necessary.

The kiln exhaust gases which have been greatly cooled by the boiler are delivered via the induced draught duct 11 to a filter which is not shown in detail to separate out any solid particles which may still be contained in the gases. Any utilisation of the heat which may be necessary in certain circumstances for raw material drying before filtering can be achieved with the exhaust gases from the boiler 4a and the air which is heated by the cooler and introduced via the delivery duct 15.

The apparatus forms an interconnected thermal assembly and is best suited for the case where a large quantity of favourably priced fuel is available near the plant. In this case it is possible to use a fuel of lower quality which in the case of conventional apparatus designed only for the production of burnt material would no longer ensure economical operation of the kiln. The longer residence time of the material to be burnt in the rotary kiln which results from the lower calorific value and the consequent reduction in the specific throughput is compensated for by the simultaneous production of electrical energy.

The apparatus which operates by the method according to the invention is of particular interest when on the one hand the price of fuel is very low and on the other hand the price of electricity is very high. In such a case the apparatus can be used essentially for current generation, with all the exhaust gases from the rotary kiln—with a high temperature—being passed via the bypass 7 directly to the apparatus 4 for generating electrical energy. In this case the higher specific heat consumption for producing burnt material is acceptable because with the large quantities of high-temperature exhaust gases from the rotary kiln a good degree of utilisation can be achieved in the apparatus 4 for generating electrical energy.

The combination of the use of low-grade fuel to produce the hot kiln exhaust gases and the use of the kiln exhaust gases in the given temperature range (between 700° and 1200° C.) to generate the electrical energy make economical operation of the apparatus possible. Therefore the fuels in question are particularly those which have a calorific value between 300 and 4000 kcal/kg.

It is, of course, also possible within the scope of the invention to operate the apparatus in such a way that in the event of a great requirement for burnt material fuel of a higher quality is used, whereas otherwise fuel of lower quality is used.

I claim:

1. A method of producing cement clinker and generating electrical energy comprising:
   a) delivering preheated cement raw material from a preheater to a kiln;
   b) burning a sufficient quantity of low caloric value fuel in said kiln to form cement clinker from said material;
   c) delivering gases of combustion from said kiln to said preheater to preheat said raw material; and
   d) delivering said gases of combustion from said preheater to thermally operated electrical energy generating apparatus and at such elevated temperature as to operate said apparatus.

2. The method according to claim 1 wherein the temperature of the gases of combustion delivered to said generating apparatus is between about 700° C. and 1200° C.

3. The method according to claim 2 wherein the temperature of the gases of combustion delivered to said generating apparatus is between about 800° C. and 900° C.

4. The method according to claim 1 including delivering said clinker to a cooler; passing cooling air through said cooler to cool said clinker and heat said cooling air; and delivering said heated cooling air to said generating apparatus.

5. The method according to claim 1 including introducing additional low caloric value fuel to said gases of combustion to a calciner upstream from said preheater and combusting said additional fuel in said calciner.

6. The method according to claim 1 including diverting a proportion of said gases of combustion from said preheater and delivering said proportion of said gases of combustion directly to said apparatus for generating electrical energy.

7. The method according to claim 1 including delivering said clinker to a cooler; passing cooling air through said cooler to cool said clinker and heat said cooling air; and delivering selected proportions of said heated cooling air to said preheater and said apparatus for generating electrical energy.

8. The method according to claim 1 wherein said fuel has a calorific value of between about 300 and 4000 kcal/kg.

9. The method according to claim 1 wherein said fuel has a calorific value of between about 300 and 4000 kcal/kg and the temperature of the gases delivered from said preheater is between about 800° C. and 900° C.

10. Apparatus for producing cement clinker and driving thermally operated electrical energy generator means comprising:
    a) a preheater;

b) means for delivering cement raw material to said preheater;

c) a kiln;

d) means for delivering said material from said preheater to said kiln;

e) means for delivering and combusting low caloric value fuel in said kiln in such quantity as to burn said material and produce cement clinker in said kiln and generate gases of combustion of sufficiently high temperature to operate said electrical energy generating apparatus;

f) means for conducting hot gases of combination from said kiln to said preheater to preheat the material in said preheater; and g) means for delivering said gases of combustion from said preheater to said electrical energy generator means.

11. Apparatus according to claim 10 wherein the temperature of said gases of combustion is sufficiently high that the temperature of such gases delivered from said preheater is between about 700° C. and 1200° C.

12. Apparatus according to claim 10 wherein the temperature of said gases of combustion is sufficiently high that the temperature of such gases delivered from said preheater is between about 800° C. and 900° C.

13. Apparatus according to claim 10 including a cooler, means for delivering said clinker from said kiln to said cooler, means for passing cooling air through said cooler to cool said clinker and heat said cooling air, and means for delivering heated cooling air from said cooler to said generator apparatus.

14. Apparatus according to claim 10 wherein the means for delivering said hot gases of combustion to said preheater comprises a duct; and means for introducing additional fuel into said duct and combusting said additional fuel in said duct.

15. Apparatus according to claim 14 wherein said additional fuel has a caloric value of between about 300 and 4000 kcal/kg.

16. Apparatus according to claim 10 including means for diverting a proportion of said gases of combustion from said preheater and delivering said proportion of said gases directly to said generator means.

17. Apparatus according to claim 10 wherein said generator means comprises a steam boiler to which said gases of combustion are delivered and a steam driven generator operatively associated with said boiler.

18. Apparatus according to claim 10 wherein said fuel has a caloric value of between about 300 and 4000 kcal/kg.

19. Apparatus according to claim 10 wherein said fuel has a calorific value of between about 300 and 4000 kcal/kg and the temperature of the gases delivered from said preheater is between about 800° C. and 900° C.

* * * * *

UNITED STATES PATENT AND TRADEMARK OFFICE
CERTIFICATE OF CORRECTION

PATENT NO. : 5,216,884
DATED : June 8, 1993
INVENTOR(S) : Dietmar Holsiepe

It is certified that error appears in the above-identified patent and that said Letters Patent is hereby corrected as shown below:

Column 3, line 10, change "preheated" (second occurrence) to -- preheater --.

Column 5, line 12, change "combination" to -- combustion --.

Signed and Sealed this

Fourth Day of January, 1994

Attest:

BRUCE LEHMAN

Attesting Officer     Commissioner of Patents and Trademarks